United States Patent
Taguchi et al.

(10) Patent No.: US 10,086,679 B2
(45) Date of Patent: Oct. 2, 2018

(54) FRONT WINDSHIELD

(71) Applicant: HONDA MOTOR CO., LTD., Tokyo (JP)

(72) Inventors: Katsuaki Taguchi, Wako (JP); Makoto Kawai, Wako (JP); Shigeaki Nishina, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/240,536

(22) Filed: Aug. 18, 2016

(65) Prior Publication Data

US 2017/0050498 A1    Feb. 23, 2017

(30) Foreign Application Priority Data

Aug. 19, 2015    (JP) .................................. 2015-162298

(51) Int. Cl.
*B60J 1/02* (2006.01)
*B60J 1/00* (2006.01)

(52) U.S. Cl.
CPC ........ *B60J 1/02* (2013.01); *B60J 1/007* (2013.01)

(58) Field of Classification Search
CPC .................................... B60J 1/02; B60J 1/007
See application file for complete search history.

(56) References Cited

U.S. PATENT DOCUMENTS 8,007,022 B2 *  8/2011  Fujimoto ............... B60J 1/02
                                             296/84.1
2007/0102950 A1   5/2007  Uematsu et al.

FOREIGN PATENT DOCUMENTS

JP    2011-240779 A    12/2011

OTHER PUBLICATIONS

Office Action dated Jun. 1, 2018, issued in counterpart Chinese Application No. 201610458417.1. (7 pages).

* cited by examiner

*Primary Examiner* — D Glenn Dayoan
*Assistant Examiner* — Melissa A Black
(74) *Attorney, Agent, or Firm* — Westerman, Hattori, Daniels & Adrian, LLP

(57) ABSTRACT

A front windshield includes a frame portion extending along the circumferential edge, the frame portion includes a lower edge portion extending along the lower edge of the front windshield, and a recess depressed downward from the inner edge of the lower edge portion, and at least a part of a perception mark, which allows the driver of the vehicle to perceive a position based on the vehicle, is provided inside the recess.

7 Claims, 9 Drawing Sheets

FRONT WINDSHIELD

CROSS-REFERENCE OF RELATED APPLICATION

This application claims priority of Japanese Patent Application No, 2015-162298 filed in Japan on Aug. 19, 2015, the entire contents of which are incorporated herein by reference.

TECHNICAL FIELD

The present invention relates to a front windshield.

BACKGROUND OF THE INVENTION

A technique has been disclosed (see Japanese Patent Application Publication No. 2011-240779, for example) in which a perception mark for allowing the driver to perceive the positional relation between the position of the driver and the center in the vehicle width direction, to support driving of the vehicle without obstructing the driver's view is provided, in a position shifted upward for a predetermined height from a frame portion extending the circumferential edge of a front window.

However, the technique described in Japanese Patent Application Publication No. 2011-240779 does not facilitate spacing between vehicles in the right-left direction. Also, in the technique described in Japanese Patent Application Publication No. 2011-240779, the perception mark is provided in a position away from the frame portion of the front windshield, and therefore may be mistaken as dust or other objects attached to the front windshield.

SUMMARY OF THE INVENTION

The present invention has been made in view of the foregoing, and aims to provide a front windshield that facilitates spacing between vehicles in the right-left direction, and can prevent confusion of a perception mark with dust or other objects.

(1) To achieve the above objective, a front windshield according to an aspect of the present invention includes a frame portion formed along the circumferential edge of the windshield extending along and at a position adjacent to the circumferential edge, the frame portion includes a lower edge portion extending along the lower edge of the front windshield, and a recess depressed downward from the inner edge of the lower-edge portion (such as a cutout part of the frame portion), and at least a part of a perception mark predetermined based on the vehicle position such as its part of exterior and its view from the driver through the front windshield, which allows the driver of the vehicle to perceive a position based on the vehicle by associating the mark with the vehicle position in the view from the driver, is provided inside the recess.

(2) Also, in the front windshield according to an aspect of the present invention, the center of the perception mark may be arranged on a straight line, which connects the lower edge portions at both ends in the vehicle width direction of the recess.

(3) Also, in the front windshield according to an aspect of the present invention, the perception mark may be circular, and the recess may be formed into a shape bent downward from the lower edge portion.

(4) Also, in the front windshield according to an aspect of the present invention, the recess may have a polygonal shape formed of lateral sides extending downward from the lower edge portion, and a base extending substantially parallel to the lower edge portion from the lateral sides.

(5) Also, in the front windshield according to an aspect of the present invention, the position based on the vehicle may be the tip end of the center in the vehicle width direction of the vehicle.

(6) Also, in the front windshield according to an aspect of the present invention, a second perception mark may be provided in a position where the center in the vehicle width direction and the vehicle-mounted front windshield intersect with each other.

According to (1), by perceiving the perception mark, the driver can simultaneously perceive the line of the lower edge portion of the frame portion of the front windshield. Hence, according to (1), the driver can simultaneously perceive horizontally in the vehicle width direction (flatness and tilt of the vehicle), so that his/her feel of the right-left direction of the vehicle can be improved. Also, according to (1), since the perception mark is continuous with the lower edge portion of the frame portion, the driver's confusion of the perception mark with dust or other objects can be prevented.

Also, according to (2), since the center of the perception mark coincides with the line of the lower edge portion, the driver can perceive the line of the lower edge portion to be continuous with the perception mark, and improve his/her feel of horizontally in the vehicle width direction of the vehicle.

Also, according to (3), the bend points at which the recess is bent from the lower edge portion accentuate the difference between the perception mark having no bend points, and the recess. Hence, the driver can unconsciously perceive the lower edge portion to be separate from the perception mark.

Also, according to (4), since the recess has a polygonal shape, the driver can perceive the recess to be more distinctly separate from the perception mark. Moreover, according to (4), since the upper base of the recess extends substantially parallel to the lower edge portion, the driver can perceive horizontally in the vehicle width direction more easily.

Also, according to (5), by unconsciously associating the center in the vehicle width direction perceived by the perception mark, and horizontally in the vehicle width direction perceived by the lower edge portion, it is possible to also grasp positions of lateral surfaces in the vehicle width direction. This makes it easier to pull the vehicle over to the side, or to drive along the white line of a road.

Also, according to (6), since a second perception mark is provided in addition to the perception mark, the center in the vehicle width direction can be perceived more accurately.

DETAILED DESCRIPTION OF THE INVENTION

Hereinafter, an embodiment of the present invention will be described with reference to the drawings.

Figure 1:
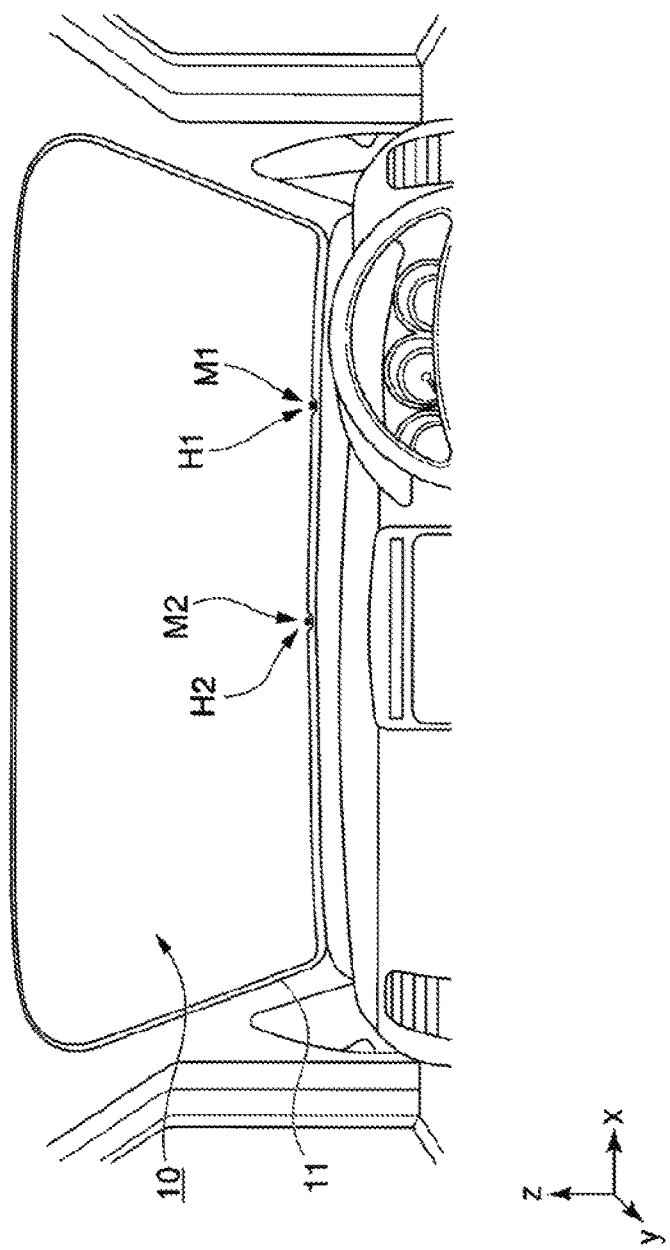
FIG. 1 is a diagram showing a front windshield of a vehicle of the embodiment, as viewed from inside a vehicle compartment.
Figure 2:
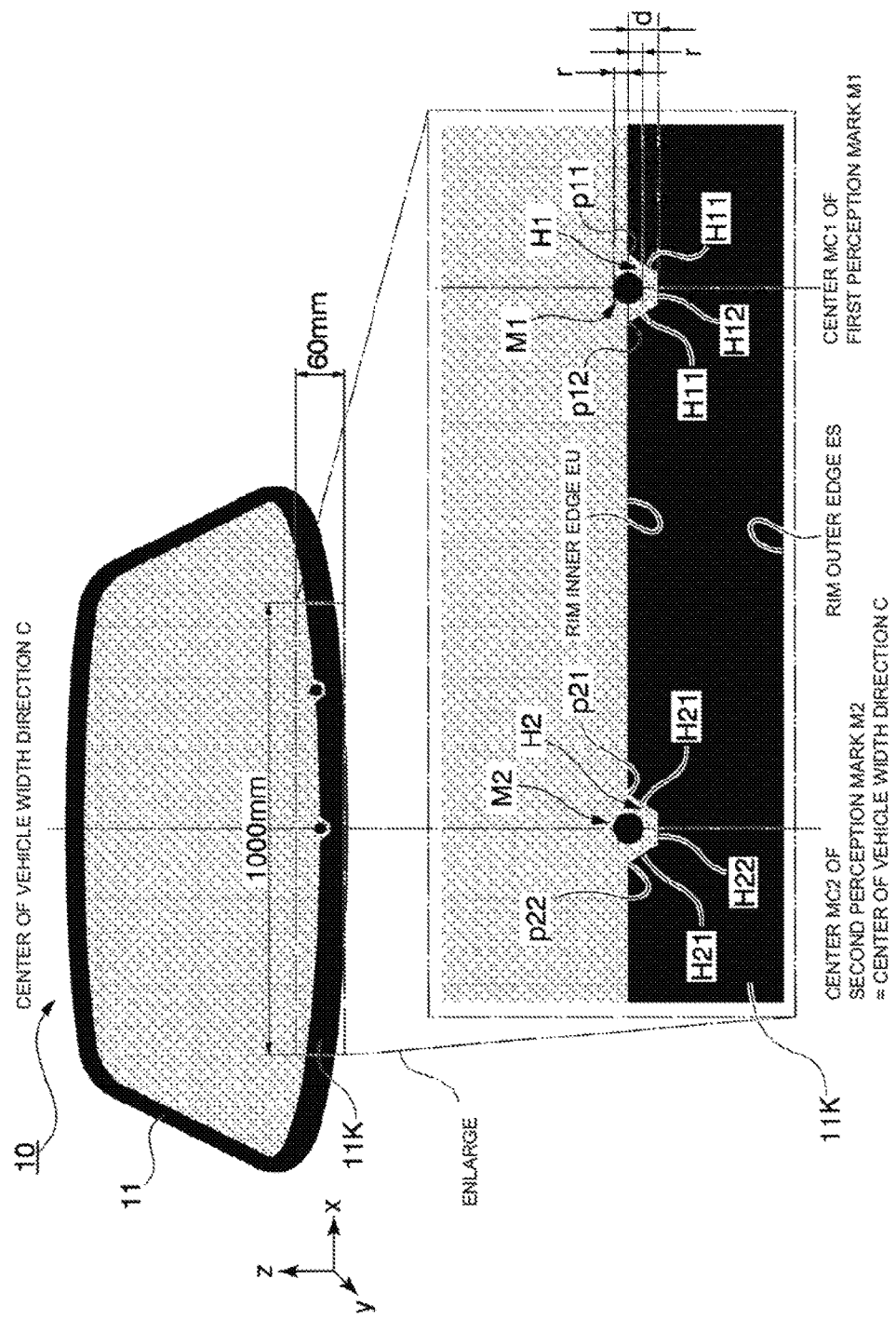
FIG. 2 is a diagram showing shapes and positions of a first perception mark, a second perception mark, a first recess, and a second recess of the embodiment.
Figure 3:
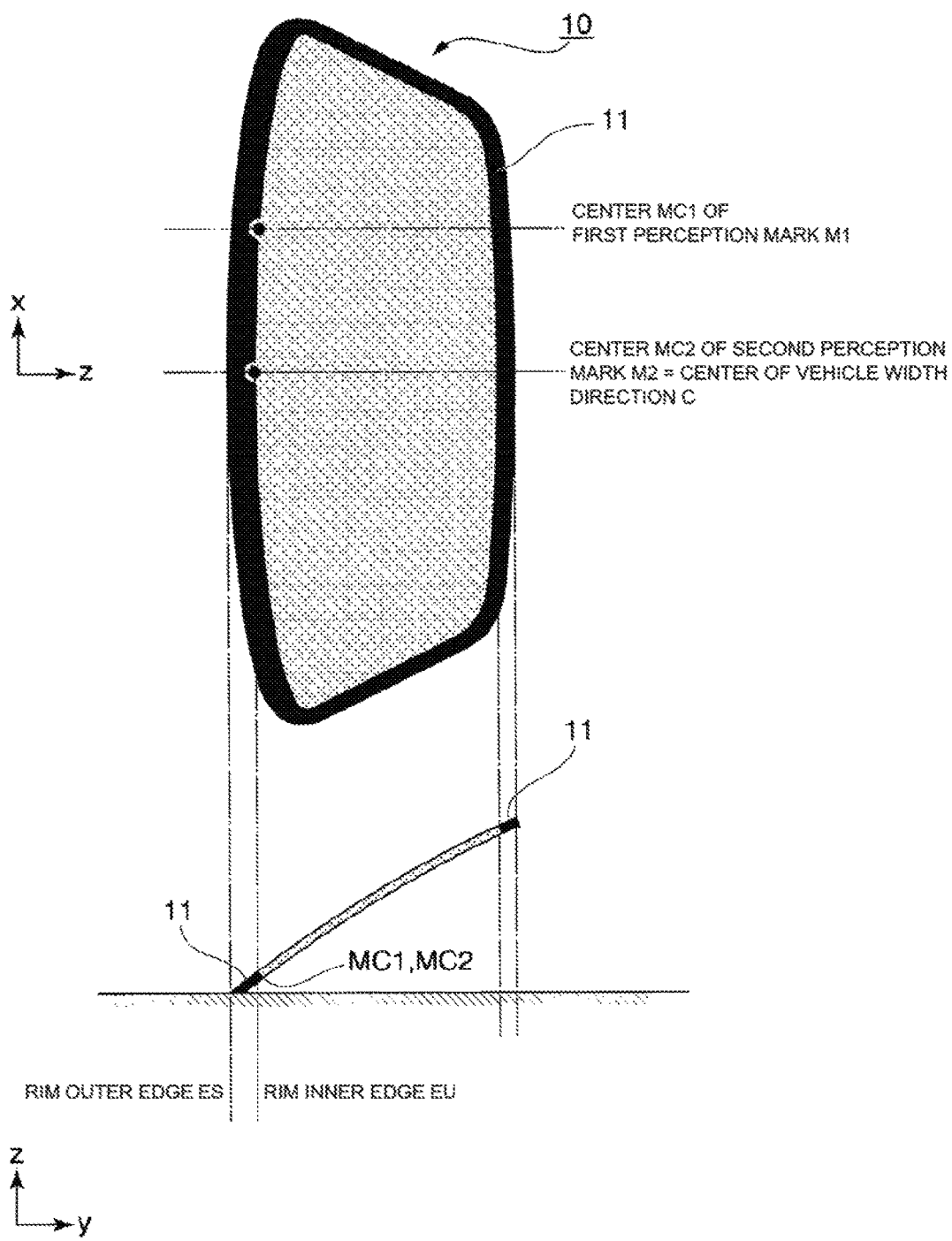
FIG. 3 is a plan view and a sectional side view of the front windshield of the embodiment.

FIG. 1 is a diagram showing a front windshield 10 of a vehicle of the embodiment as viewed from inside a vehicle compartment. FIG. 2 is a diagram showing shapes and positions of a first perception mark M1, a second perception mark M2, a first recess H1, and a second recess H2 of the embodiment. FIG. 3 is a plan view and a sectional side view of the front windshield 10 of the embodiment. FIG. 2 is a diagram showing the front windshield 10 as viewed from inside the vehicle compartment. Note that in FIGS. 1 to 3, the vehicle width direction is referred to as an x-axis direction, the longitudinal direction of the vehicle is referred to as a y-axis direction, and the height direction of the vehicle is referred to as a z-axis direction. Also note that the example shown in FIGS. 1 to 3 is that of a so-called right-hand drive.

As shown in FIG. 2, a frame portion 11 is typically an opaque portion such as a coating or a covering member formed on the transparent windshield body of the front windshield 10. The frame portion 11 extends along the circumferential edge of the front windshield 10 and has a lower edge portion 11K extending along the lower edge of the front windshield 10. In the embodiment, an inner (upper) edge of the lower edge portion 11K is referred to as a frame inner edge ED which is defined by an upper edge line extending in the vehicle width direction), and an outer (bottom) edge of the lower edge portion 11K is referred to as a frame outer edge ES.

The first recess H1 and second recess H2 are formed in the lower edge portion 11K of the frame portion 11. Each of the first recess H1 and second recess H2 has a depth d in the z-axis direction. Each of the first recess H1 and second recess H2 is formed into a trapezoid, for example.

The first recess H1 is formed on the driver's seat side of a center in the vehicle width direction (hereinafter referred to as center of vehicle width direction) C. The first recess H1 includes legs H11 and a base H12, and has an opening connecting a point p11 and point p12. Note that the point p11 and point p12 are intersections between the frame inner edge EU and the legs H11. The opening and the line of the frame inner edge EU coincide with each other. Also, the base H12 and the frame inner edge EU are substantially parallel to each other.

The second recess H2 is formed at the center of vehicle width direction C. The second recess H2 includes legs H21 and a base H22, and has an opening connecting a point p21 and point p22. Note that the point p21 and point p22 are intersections between the frame inner edge EU and the legs H21. The opening and the line of the frame inner edge EU coincide with each other. Also, the base H22 and the frame inner edge EU are substantially parallel to each other.

Note that the depth d is 6 mm, for example, the lengths of the base H12 and base H22 is 7 mm, for example, and the length of the openings is 14 mm, for example.

Note that the first recess H1 and second recess H2 may differ in shape and size, as long as they are formed as cutouts in the lower edge portion 11K of the frame portion 11. Also, the shape of the first recess H1 and second recess H2 is not limited to a trapezoid, and may be any shape in which the first perception mark M1 and second perception mark M2 do not come into contact with each other, such as a triangle, a rectangle, a polygon, and a semicircular shape.

Each of the first perception mark M1 and second perception mark M2 is formed into a substantially circular shape. Each of the first perception mark M1 and second perception mark M2 has a radius r. The radius r is smaller than the depth d of the first recess H1 and second recess H2.

Note that the first perception mark M1 and second perception mark M2 are preferably perceivable by peripheral view of a driver viewing the front in the traveling direction during travel of the vehicle, for example, and have a size and color that do not bother the driver. Each of the first perception mark M1 and second perception mark M2 is preferably formed into a circular shape having a 6 mm diameter 2 r, and is black, for example, which is of the same color system as the frame portion 11 coated with black ceramic, for example.

The outer periphery of the first perception mark M1 is formed at a height d-r from the base H12 of the first recess H1, in the y-axis direction. In other words, in the example shown in FIGS. 1 to 3, half of the first perception mark M1 is provided inside the first recess H1. Note that as shown in FIGS. 1 to 3, the first perception mark M1 does not come into contact with any of sides and edges surrounding the first perception mark M1, i.e., does not come into contact with any of the legs H11 and base H12 of the first recess H1, and the frame inner-edge EU. Also, a center MC1 of the first perception mark M1 substantially coincides with the center of the base H12 of the first recess H1. Additionally, as shown in FIGS. 1 to 3, the center of the first perception mark M1 is arranged on a straight line connecting the point p11 and point p12, in the x-axis direction.

The enter periphery of the second perception mark M2 is formed at a height d-r from the base H22 of the second recess H2, in the y-axis direction. In other words, in the example shown in FIGS. 1 to 3, half of the second perception mark M2 is provided inside the second recess H2. Note that as shown in FIGS. 1 to 3, the second perception mark M2 does not come into contact with any of sides and edges surrounding the second perception mark M2. Also, a center MC2 of the second perception mark M2 substantially coincides with the center of the base H22 of the second recess H2 and the center of vehicle width direction C. Additionally, as shown in FIGS. 1 to 3, the center of the second perception mark M2 is arranged on a straight line connecting the point p21 and point p22, in the x-axis direction.

Each of the first perception mark M1 and second perception mark M2 may be formed into a triangle, a rectangle, a perfect circle, an oval, a polygon, or other shapes. Also, it is preferable that the shape of the first perception mark M1 and second perception mark M2 differ from the shape of the first recess H1 and second recess H2. For example, when the first recess H1 is formed into a trapezoid having bend points, the first perception mark M1 is preferably formed into a circular shape having no bend points. Note that in the embodiment, a circular shape includes a perfect circle, an oval, and a cam-like shape.

Note that as described in Japanese Patent Application Publication No. 2011-240779, making the first perception mark M1 and second perception mark M2 black and circular, for example, improves accuracy and stability in driving of the vehicle by the driver even more, surely supports driving to ease the load while driving, and ensures running safety, as compared to forming the marks in different shapes such as a triangle, or in different colors such as blue and pink.

Figure 4:
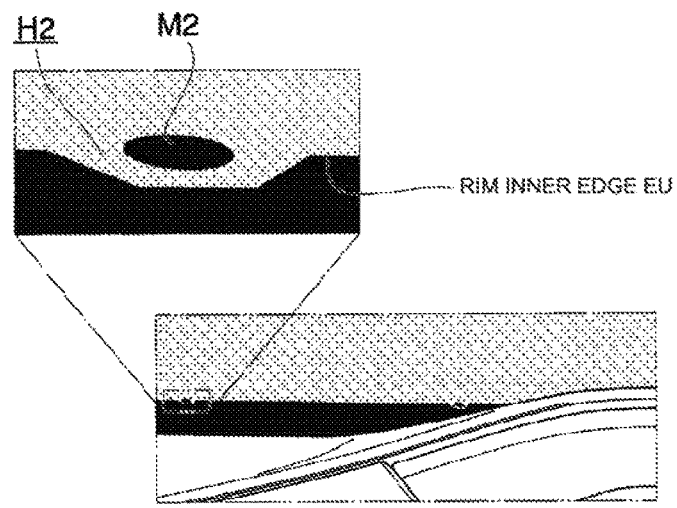
FIG. 4 is a diagram showing an example of how the first perception mark and first recess are viewed from inside the vehicle of the embodiment.

FIG. 4 is a diagram showing an example of how the first perception mark M1 and first recess H1 are viewed from inside the vehicle of the embodiment. Note that the example shown in FIG. 4 is that of a so-called right-hand drive.

As shown in FIG. 4, the first perception mark M1 appears to be separated from the first recess H1 formed in the frame portion 11. Also, the centerline in the x-axis direction of the first perception mark M1 appears to substantially coincide with the frame inner edge EU of the frame portion 11.

Note that although FIGS. 1 to 4 describe an example in which half of the first perception mark M1 is provided inside the first recess H1, it is sufficient that at least a part of the first perception mark M1 be provided inside the first recess H1.

<Where First Perception Mark M1 is Arranged, and where First Recess H1 is Formed>

Next, an example of where the first perception mark M1 is arranged will be described.

Figure 5:
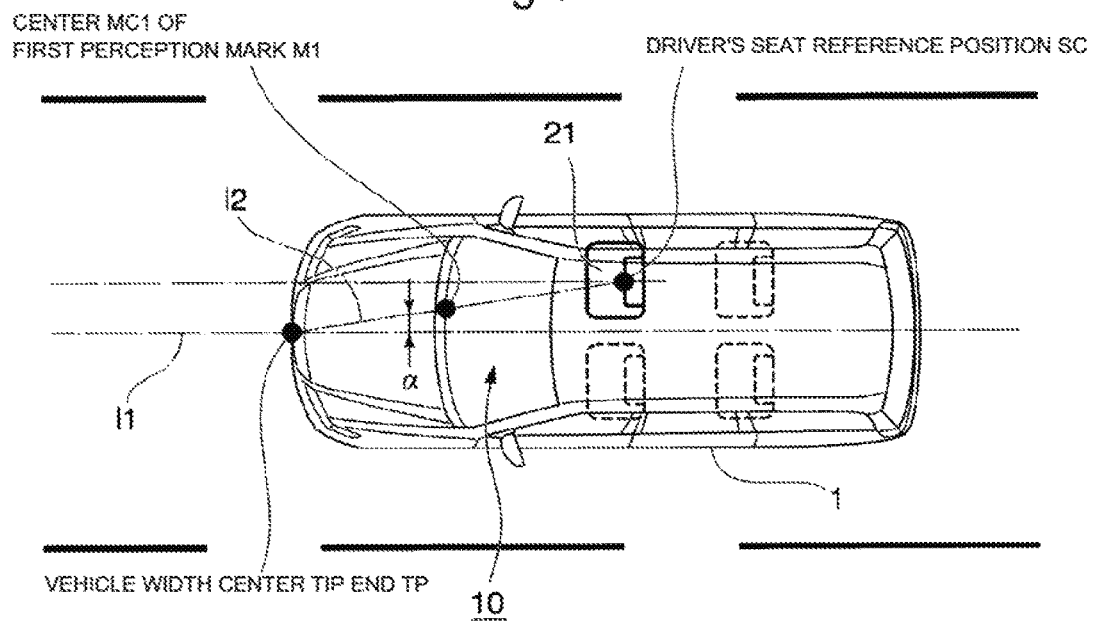
FIG. 5 is a diagram showing an example of where the first perception mark of the embodiment is arranged.

FIG. 5 is a diagram showing an example of where the first-perception mark M1 of the embodiment is arranged.

As shown in FIG. 5, the center MC1 of the first perception mark M1 coincides with a position where a straight line 12, which connects the tip end (vehicle width center tip end TP) of the center in the vehicle width direction of a vehicle 1 and a reference position SC (hereinafter referred to as driver's seat-reference position SC) of a driver's seat 21, intersects with the front windshield 10. Note that the driver's seat reference position SC may be any possible eye point location of a driver sitting in the driver's seat, and is not limited by the form of the seat. Since the location of eye point varies depending on the driver, the driver's seat reference position SC may foe set to any position within a range of possible eye point locations of a driver of average build.

Note that in the example of FIG. 5, the first recess H1 is formed in a position corresponding to the first perception mark M1, in the lower edge portion 11K.

Also, as shown in FIG. 5, a line 11 passing through the center of vehicle width direction C and parallel to the y-axis direction, and a line 12 connecting the center MC1 of the first perception mark M1 and the vehicle width center tip end TP form an angle α.

As has been described, in the front windshield 10 of the embodiment, the first perception mark M1 is arranged on the front windshield 10 between the driver's seat reference position SC and the vehicle width center tip end TP, where the line 11 passing through the center of vehicle width direction C and parallel to the y-axis direction, and the line 12 connecting the center MC1 of the first perception mark M1 and the vehicle width center tip end TP form the angle α.

Note that although FIG. 5 describes the tip end of the center in the vehicle width direction of the vehicle (vehicle width center tip end TP) as an example of a position based on the vehicle, the embodiment is not limited to this. The second perception mark M2 described in FIGS. 1 to 4 is a mark for perceiving the position of the center in the vehicle width direction. Also, the first perception mark M1 may be arranged in a position for grasping a position shifted frontward for a predetermined distance (for the safety margin), from a corner of a front part of the vehicle, or from the front end of the vehicle. In this case, too, the first recess H1 is formed in a position corresponding to the position of the perception mark, in the lower edge portion 11K of the frame portion 11.

As described above, the perception mark is a mark for perceiving the tip end of the center in the vehicle width direction of the vehicle, a mark for perceiving the center in the vehicle width direction, and a mark for grasping a position shifted frontward for a predetermined distance from a corner of a front, part of the vehicle, or from the front end of the vehicle, for example.

According to the embodiment configured in this manner, by perceiving the first perception mark M1, the driver can unconsciously and instinctively perceive the positional relation between the position of the driver and the center of vehicle width direction C. Hence, the embodiment can improve accuracy and stability in driving by supporting driving of the vehicle without obstructing the driver's view, and correctly reflect the driver's intention of driving in the vehicle's behavior to ensure running safety.

Note that, although the above-described example includes the first perception mark M1 and first recess H1, and the second perception mark M2 and second recess H2, the embodiment is not limited to this. Of the set of first perception mark M1 and first recess H1, and the set of second perception mark M2 and second recess H2, it is sufficient that at least, a single set of the perception mark and recess be provided in the front windshield 10.

Also, although in the above-described example the front windshield 10 includes two sets of perception marks and recesses, it may include three or more sets of perception marks and recesses.

Note that although the above-described example is that of a right-hand drive, the vehicle may be a left-hand drive. In this case, the first recess H1 is formed in the frame inner-edge EU, on the left driver's seat side of the center of vehicle width direction C. Also, a part of the first perception mark M1 is included in the first recess H1.

First Experiment and Experiment Result

Next, a description will be given of a result of an experiment (hereinafter also referred to as parking frame vehicle park experiment) of parking a vehicle in a parking frame, using a vehicle in which the front windshield 10 of the embodiment is installed. This experiment checks the driver's feel of the longitudinal direction of the vehicle.

Figure 6:
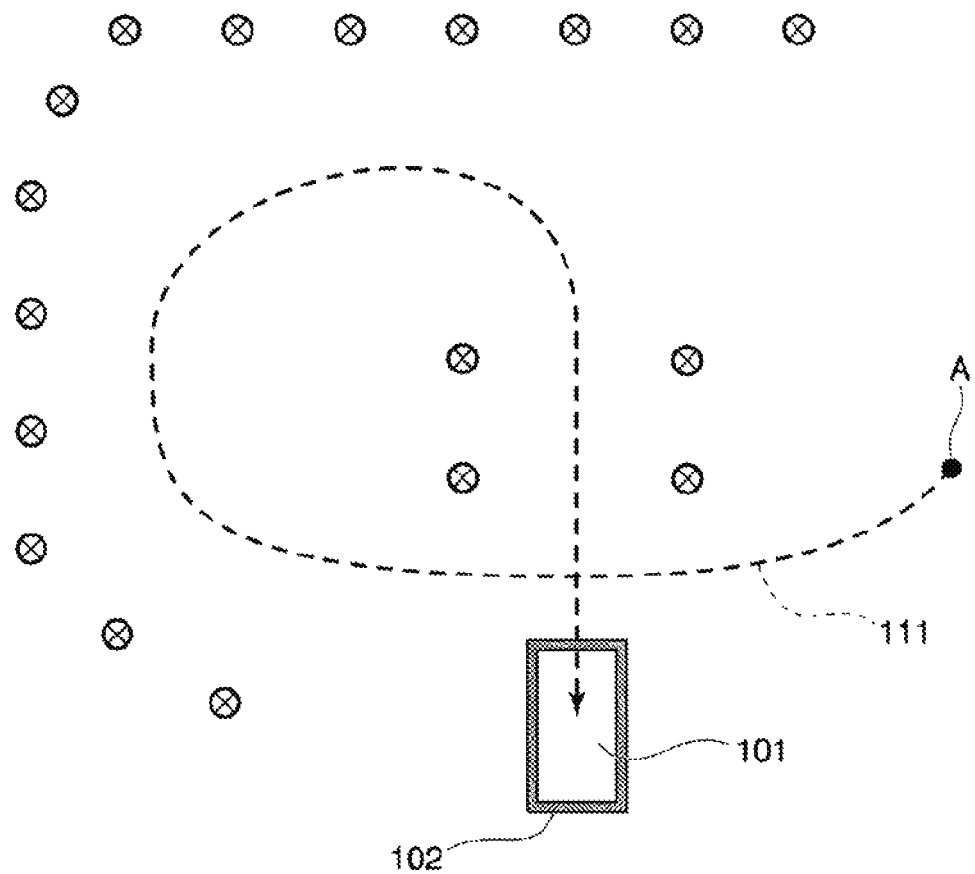
FIG. 6 is a diagram showing a parking space and a trajectory of a vehicle in a first experiment.
Figure 7:
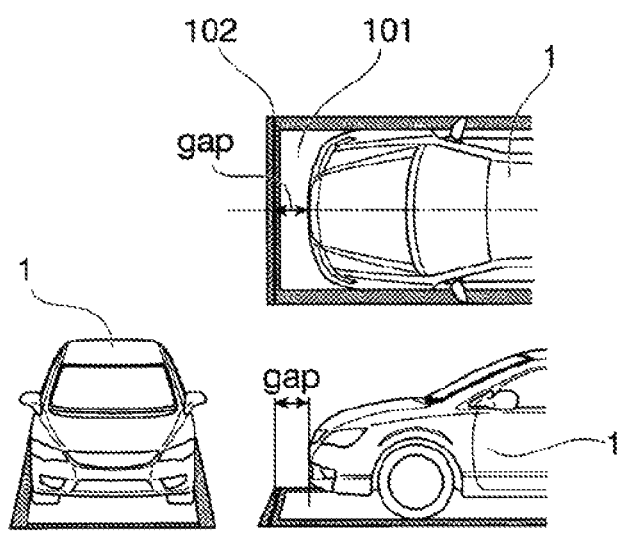
FIG. 7 is a diagram showing the parking space, a front limit stop line, and a gap between the front limit stop line and the vehicle in the first experiment.

FIG. 6 is a diagram showing a parking space and a trajectory of a vehicle in a first experiment. FIG. 7 is a diagram showing the parking space, a front limit stop line, and a gap between the front limit stop line and the vehicle in the first experiment.

In FIGS. 6 and 7, an area 101 is a parking space, and a line 102 is a front limit stop line. Note that in the parking frame vehicle park experiment, the front limit stop line indicates a position in an actual parking lot where a car stop is provided, or where a wall or other object in front of the parking space 101 is located.

Also, in FIG. 6, a broken line 111 indicates a trajectory of the vehicle 1 when it is being parked in the parking space area 101, from a point A. Additionally, in FIG. 7, "gap" indicates a gap between the tip end of the center in the vehicle width direction of the vehicle 1 and the front limit stop line 102, when the vehicle 1 is parked in the parking space area 101.

A comparative experiment was performed by use of the following three types of front windshields.

First Comparative Example A front windshield with no perception mark or recess

Second Comparative Example A front windshield having a single perception mark, which is arranged in a position shifted to the driver's seat side for a predetermined distance from the center in the vehicle width direction of the front windshield, and shifted upward for a predetermined vertical height from an inner edge position in a frame portion in the vertical direction of the front wind shield (see Japanese Patent Application Publication No. 2011-240779)

This Embodiment The front windshield 10 including the first recess H1, second recess H2, first perception mark M1, and second perception mark M2

Note that the experiment was performed by use of the right-hand ride vehicle 1. Also, in the experiment, 30 drivers drove the respective vehicles in which the front windshields of the first comparative example, the second comparative example, and this embodiment are installed, and parked them in the parking space 101.

Figure 8:
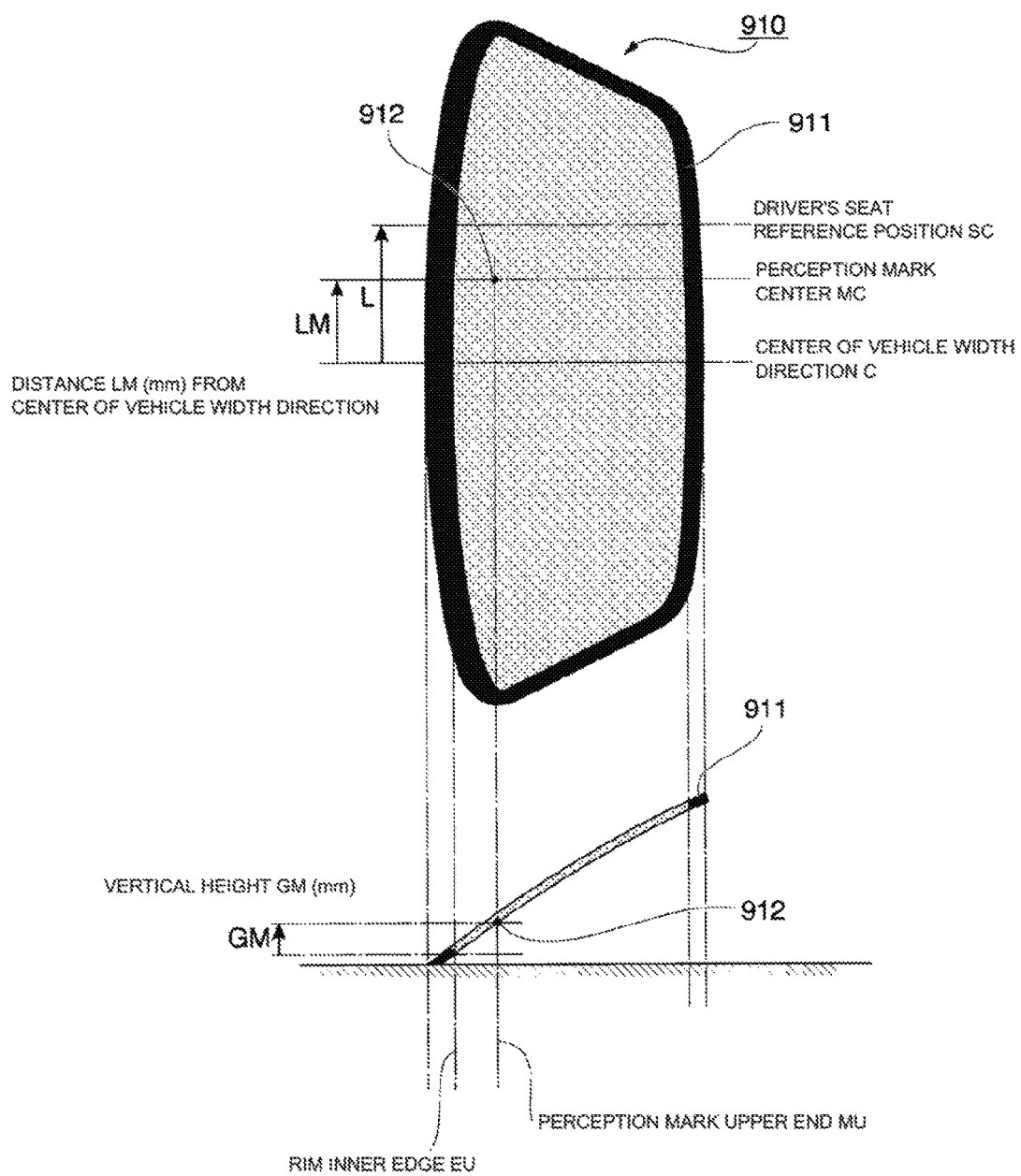
FIG. 8 is a diagram showing a front windshield of a second comparative example having a single perception mark, used in the first experiment and a second experiment.

FIG. 8 is a diagram showing a front windshield 910 of the second comparative example having a single perception mark 912, used in the first experiment and a second experiment.

As shown in FIG. 8, the front windshield 910 has a frame portion 911. Also, in the vehicle width direction of the front windshield 910, a center (perception mark center MC) of a perception mark M is shifted to the driver's seat side for a predetermined distance LM from the center of vehicle width direction C. In the vertical direction of the vehicle, a perception mark upper end MU is shifted upward for a vertical height GM, from the frame inner edge EU. The height GM is (31.5±6) mm, for example. The predetermined distance LM is {(L×0.622)±6} mm, for example.

Figure 9:
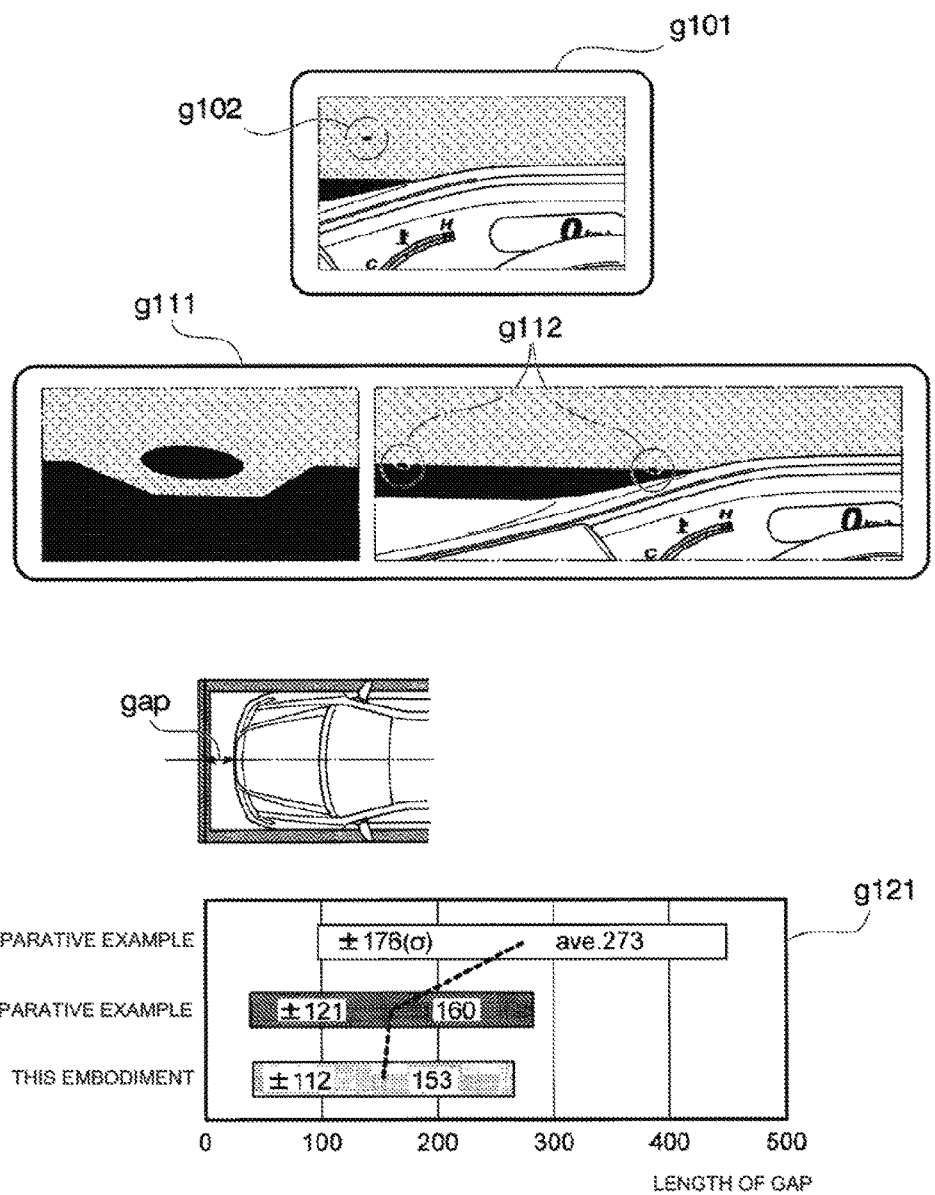
FIG. 9 is a diagram showing an image of the front windshield of the second comparative example as viewed from inside the vehicle, an image of the front windshield of the embodiment as viewed from inside the vehicle, and results of the first experiment.

FIG. 9 is a diagram showing an image of the front windshield 910 of the second comparative example as viewed from inside the vehicle, an image of the front windshield 10 of this embodiment as viewed from inside the vehicle, and results of the first experiment.

In FIG. 9, an image g101 is an image of the front windshield 910 of the second comparative example, as viewed from inside the vehicle. A circled area g102 indicates the perception mark M.

Meanwhile, an image g111 is an image of the front windshield 10 of this embodiment, as viewed from inside the vehicle. Circled areas g112 indicate the first recess H1, second recess H2, first perception mark M1, and second perception mark M2.

In FIG. 9, a graph g121 shows respective experiment results of the first comparative example, the second comparative example, and this embodiment. In the graph g121, the horizontal axis indicates the length [mm] of the gap. Note that the position of the front limit stop line is 0 [mm].

The experiment result of the first comparative example shows that the average of the gap lengths was 273 [mm], and the range of measured values was average ±176 [mm] (=97 [mm]~449 [mm]).

The experiment result of the second comparative example shows that the average of the gap lengths was 160 [mm], and the range of measured values was average ±121 [mm] (=39 [mm]~281 [mm]).

The experiment result of this embodiment shows that the average of the gap lengths was 153 [mm], and the range of measured values was average ±112 [mm] (=41 [mm] ~265 [mm]).

As shown in FIG. 9, in this embodiment, the average was reduced by 120 [mm], and the range of variation was reduced by ±64 [mm], as compared to the first comparative example.

Moreover, in this embodiment, the average was reduced by 7 [mm], and the range of variation was reduced by ±9 [mm], as compared to the second comparative example.

In other words, in the parking frame vehicle park experiment, the embodiment improved the driver's feel of the longitudinal direction of the vehicle as compared to the first comparative example that has no perception mark or recess, and had a similar effect or made a slight improvement, as compared to the second comparative example.

Second Experiment and Experiment Result

Next, a description will be given of a result of an experiment (hereinafter also referred to as left side poll over experiment) of pulling a vehicle over to the left side, using a vehicle in which the front windshield 10 of the embodiment is installed. This experiment checks the driver's feel of the right-left direction of the vehicle. Note that the second experiment was performed by comparing it with the first comparative example and second comparative example, as in the case of the first experiment.

Figure 10:
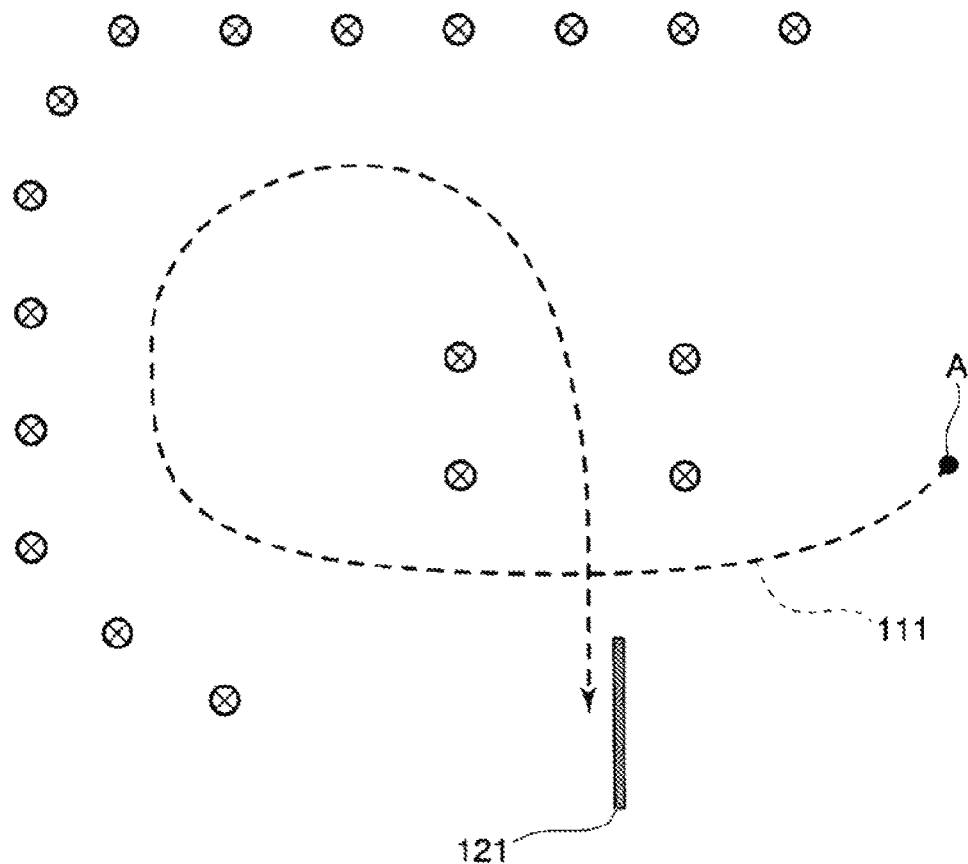
FIG. 10 is a diagram showing a parking space and a trajectory of a vehicle in the second experiment.
Figure 11:
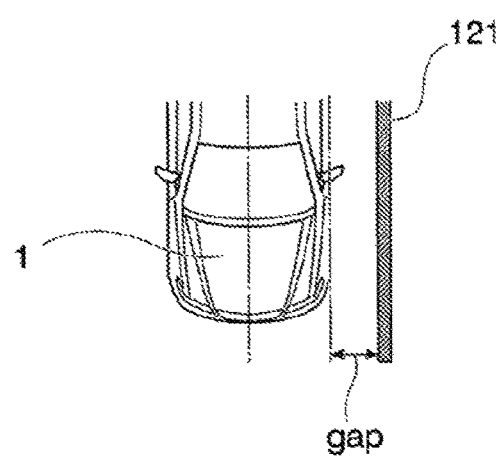
FIG. 11 is a diagram showing a left limit stop line, and a gap between the left limit stop line and the vehicle in the second experiment.

FIG. 10 is a diagram showing a parking space and a trajectory of a vehicle in the second experiment. FIG. 11 is a diagram showing a left limit stop line, and a gap between the left limit stop line and the vehicle in the second experiment.

In FIGS. 10 and 11, a line 121 is a left limit stop line. Note that in the left side pull over experiment, the left limit stop line indicates a position in an actual parking lot where a car stop is provided, or where a wall or other object on the left side of a parking space is located.

Also, in FIG. 10, the broken line 111 indicates a trajectory of the vehicle 1 when it is being pulled over to the left limit stop line, from the point A. Additionally, in FIG. 11, "gap" indicates a gap between the left side of the vehicle 1 and the left limit stop line 121, when the vehicle 1 is pulled over to the left limit stop line 121.

Figure 12:
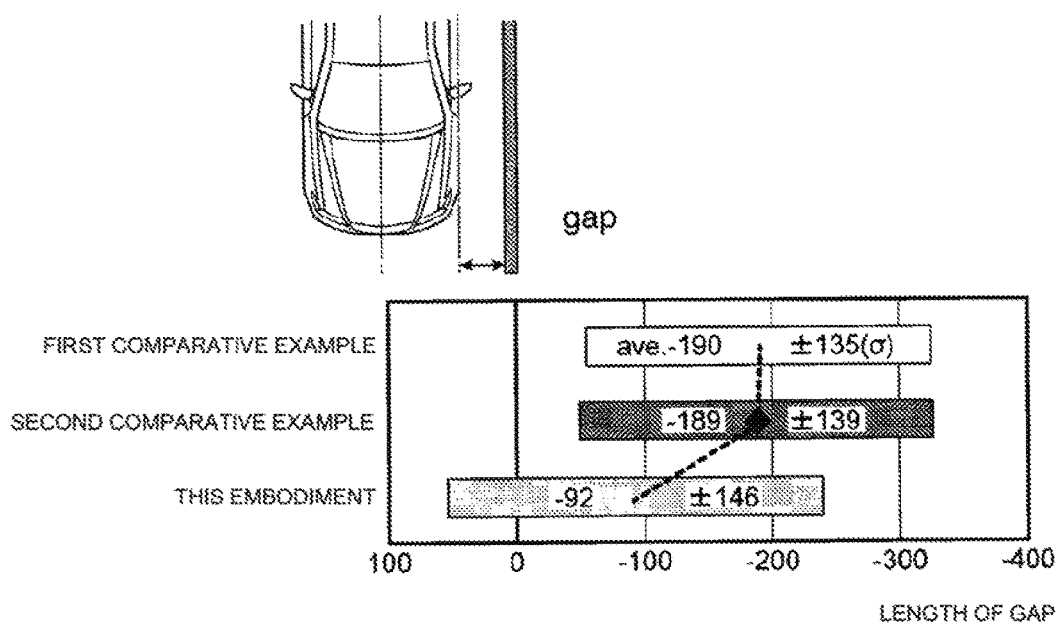
FIG. 12 is a diagram showing results of the second experiment.

FIG. 12 is a diagram showing results of the second experiment.

In FIG. 12, the horizontal axis indicates the length [mm] of the gap. Note that the position of the left limit stop line is 0 [mm].

The experiment result of the first comparative example shows that the average of the gap lengths was −190 [mm], and the range of measured values was average ±135 [mm] (=−55 [mm]~−325 [mm]).

The experiment result of the second comparative example shows that the average of the gap lengths was −189 [mm], and the range of measured values was average ±139 [mm] (=−50 [mm]~−328 [mm]).

The experiment result of this embodiment shows that the average of the gap lengths was −92 [mm], and the range of measured values was average ±146 [mm] (=+54 [mm] ~−238 [mm]).

As shown in FIG. 12, we obtained similar results for the first comparative example and the second comparative example in the left side pull over experiment.

In this embodiment, the average was reduced by 98 [mm], as compared to the first comparative example. In the left side pull over experiment, the embodiment improved the driver's feel of the right-left direction of the vehicle, and thereby improved accuracy in driving, when pulling the vehicle over to the side.

Thus, the embodiment improved the driver's feel of the longitudinal direction of the vehicle, and also improved accuracy in driving when pulling the vehicle over to the side, as compared to the first comparative example that has no perception mark or recess.

Moreover, the embodiment allows accurate perception of the relation between the center in the vehicle width direction and horizontality in the vehicle width direction (flatness and tilt), as compared to the second comparative example (technique described in Japanese Patent Application Publication No. 2011-240775). Hence, the driver's feel of the right-left direction of the vehicle (in addition to the longitudinal direction of the vehicle) can be improved, so that the vehicle can also be accurately and easily pulled over to the side opposite to the driver.

As has been described, the front windshield 10 of the embodiment includes the frame portion 11 extending along the circumferential edge, the frame portion includes the lower edge portion 11K extending along the lower edge of the front windshield, and the recess (first recess H1 and second recess H2) depressed downward from the inner edge of the lower edge portion, and at least a part of the perception mark (first perception mark M1 and second perception mark M2), which allows the driver of the vehicle to perceive a position based on the vehicle, is provided inside the recess.

This configuration allows the driver to perceive the first perception mark M1, and simultaneously perceive the line of a base 110 of the frame portion 11 of the front windshield 10. Hence, according to the embodiment, the driver can simultaneously perceive horizontality in the vehicle width direction (flatness and tilt of the vehicle), so that his/her feel of the right-left direction of the vehicle can be improved.

Also, since the first perception mark M1 is continuous with the base 110 of the frame portion 11, the driver's confusion of the first perception mark with dust or other objects can be prevented.

Thus, according to the embodiment, the first perception mark M1 or second perception mark M2 can improve accuracy and safety in driving without obstructing the driver's view, and correctly reflect the driver's intention of driving in the vehicle's behavior to ensure running safety.

Also, in the front windshield 10 of the embodiment, the center of the perception mark (first perception mark M1 and second perception mark M2) is arranged on a straight line, which connects the lower edge portions 11K at both ends in the vehicle width direction of the recess (first recess H1 and second recess H2).

Note that the lower edge portion 11K at both ends in the vehicle width direction of the recess includes the points p11 and p12, or the points p21 and p22 in FIG. 2.

According to the embodiment configured in this manner, since the center of the first perception mark M1 or second perception mark M2 coincides with the line of the lower edge portion 11K, the driver can perceive the line of the lower edge portion 11K to be continuous with the first perception mark M1 or second perception mark M2, and improve his/her feel of horizontally in the vehicle width direction of the vehicle.

Also, in the front windshield 10 of the embodiment, the perception mark (first perception mark M1 and second perception mark M2) is circular, and the recess (first recess H1 and second recess H2) is formed into a shape bent downward from the lower edge portion 11K.

According to the embodiment configured in this manner, the bend points at which the first recess H1 or second recess H2 is bent from the lower edge portion UK accentuate the difference between the first perception mark M1 or second perception mark M2 having no bend points, and the corresponding first recess H1 or second recess H2. Hence, the driver can unconsciously perceive the lower edge portion UK to be separate from the first perception mark M1 or second perception mark M2.

Also, in the front windshield 10 of the embodiment, the recess (first recess H1 and second recess H2) has a polygonal shape formed of lateral sides (legs H11 and legs H21) extending downward from the lower edge portion UK, and a base (base H12 and base H22) extending substantially parallel to the lower edge portion from the lateral sides.

According to the embodiment configured in this manner, since the first recess H1 or second recess H2 has a polygonal shape, the driver can perceive the first recess or second recess to be more distinctly separate from the first perception mark M1 or second perception mark M2. Moreover, since the base H12 or base H22 extends substantially parallel to the lower edge portion 11K, the driver can perceive horizontality in the vehicle width direction more easily.

Also, in the front windshield 10 of the embodiment, the position based on the vehicle is the tip end of the center in the vehicle width direction of the vehicle.

According to the embodiment configured in this manner, by unconsciously associating the center of vehicle width direction C perceived by the first perception mark M1 or second perception mark M2, and horizontality in the vehicle width direction perceived by the lower edge portion 11K, it is possible to also grasp positions of lateral surfaces in the vehicle width direction. This makes it easier to pull the vehicle over to the side, or to drive along the white line of a road.

Also, in the front windshield 10 of the embodiment, the second perception mark M2 is provided in a position where the center in the vehicle width direction and the front windshield intersect with each other.

According to the embodiment configured in this manner, since the second perception mark M2 is provided in addition to the first perception mark M1, the center in the vehicle width direction can be perceived more accurately.

Note that although the embodiment describes an example in which the front windshield 10 is installed in the four-wheel drive vehicle 1, the invention is not limited to this. The invention is applicable to any vehicle having a front window or a front windshield. If the frame portion 11 is not provided in the front window or front windshield, the frame portion 11 may be provided in the front window or front windshield, so that the recess and a part of the perception mark can be provided in the frame portion 11.

DESCRIPTION OF REFERENCE NUMERALS

10 . . . front windshield, 11 . . . frame portion 11K . . . lower edge portion, EU . . . frame inner edge, ES . . . frame outer edge, M1 . . . first perception mark, M2 . . . second perception mark, H1 ... first recess, H2 ... second recess, H11, H21 ... leg, H12, H22 ... base

The invention claimed is:

1. A front windshield comprising:
   a windshield body installed in a vehicle and having a peripheral edge;
   a frame portion formed on the windshield body and extending along the peripheral edge of the windshield body, said frame portion comprising a lower frame portion having an outer edge extending along a bottom peripheral edge of the windshield body and an inner edge defined by an upper edge line of the lower frame portion; and
   a perception mark formed on the windshield body at a position which is predetermined based on a view of the vehicle from a driver through the front windshield, which allows the driver to perceive a position based on the vehicle in association with the perception mark, wherein
   the lower frame portion has a recessed cutout portion of the inner edge defined by the inner edge line being in part recessed inward and downward, at least part of the perception mark being positioned inside said recessed cutout portion,
   said perception mark is formed in a round shape, and the upper edge line of the lower frame portion bends downward in a manner that forms an angled edge at each side end of said recessed cutout portion.

2. The front windshield according to claim 1, wherein said recessed cutout portion has two side ends from which the upper edge line of the lower frame portion bents downward, and
   a center of said perception mark is arranged on an imaginary straight line which connects said two side ends in a vehicle width direction.

3. The front windshield according to claim 1, wherein the predetermined position of the perception mark on the windshield body is defined by the view from the driver to a front end of the vehicle in a vehicle front-rear direction and at a center in a vehicle width direction.

4. The front windshield according to claim 3, further comprising:
   a second perception mark provided in a position where the center in the vehicle width direction and the lower frame portion on the windshield body intersect with each other.

5. A front windshield comprising:
   a windshield body installed in a vehicle and having a peripheral edge;
   a frame portion formed on the windshield body and extending along the peripheral edge of the windshield body, said frame portion comprising a lower frame portion having an outer edge extending along a bottom peripheral edge of the windshield body and an inner edge defined by an upper edge line of the lower frame portion; and
   a perception mark formed on the windshield body at a position which is predetermined based on a view of the vehicle from a driver through the front windshield, which allows the driver to perceive a position based on the vehicle in association with the perception mark, wherein
   the lower frame portion has a recessed cutout portion of the inner edge defined by the inner edge line being in part recessed inward and downward, at least part of the perception mark being positioned inside said recessed cutout portion, and
   said recessed cutout portion is shaped in part of a polygonal shape having side lines extending downward from said upper edge line and a bottom line connecting said sides by extending substantially parallel to said upper edge line.

6. The front windshield according to claim 5, wherein the predetermined position of the perception mark on the windshield body is defined by the view from the driver to a front end of the vehicle in a vehicle front-rear direction and at a center in a vehicle width direction.

7. The front windshield according to claim 6, further comprising:
   a second perception mark provided in a position where the center in the vehicle width direction and the lower frame portion on the windshield body intersect with each other.

* * * * *